United States Patent [19]

Awtrey

[11] Patent Number: 5,317,919
[45] Date of Patent: Jun. 7, 1994

[54] A PRECISION CAPACITOR SENSOR

[75] Inventor: James D. Awtrey, Garland, Tex.

[73] Assignee: Teledyne Industries, Inc., Huntsville, Ala.

[21] Appl. No.: 899,618

[22] Filed: Jun. 16, 1992

[51] Int. Cl.$^5$ .......................... G01L 7/08; G01L 9/12
[52] U.S. Cl. .................................. 73/718; 29/25.41;
73/517 R; 73/724; 361/283.3
[58] Field of Search ..................... 73/718, 724, 517 R;
361/283; 29/25.41

[56] References Cited

U.S. PATENT DOCUMENTS

| | | | |
|---|---|---|---|
| 4,609,966 | 9/1986 | Kuisma | 73/724 |
| 4,926,696 | 5/1990 | Haritonidis et al. | 73/705 |
| 5,189,591 | 2/1993 | Bernot | 73/724 |

Primary Examiner—Donald O. Woodiel
Attorney, Agent, or Firm—Charles C. Garner

[57] ABSTRACT

A precision, low cost, capacitor sensor comprised of two parallel plates, with an air dielectric, with preferably both substrates comprised of vitreous materials and electrically conductive coating, but with at least one of the substrates and coating being transparent. The coatings are preferably of identical material, thickness and pattern to offset stress distortion of the sensor plates from thermal expansion and contraction. Uniform spacing between the plates is provided by means of glass fibers of uniform diameter, dispersed in a matrix of adhesive and bonded under pressure, deposited between the plates as two thin semicircular seal rings surrounding the dielectric and separated by a diametrical gap, allowing entrance or escape of air dielectric. A novel feature, provided by at least one plate and coating being transparent, is use of optical measuring techniques during fabrication to verify acceptability of the manufacturing process and uniformity of the sensor product. This permits easy, rapid, efficient and economical grading and process control of the sensors during fabrication with resulting improved precision performance of the product and economical cost to manufacture. As an option, three or more of the four faces of the two substrates will bear conductive coatings, for structural stability, to minimize distortion in capacitance due to changes in temperature.

21 Claims, 2 Drawing Sheets

A PRECISION CAPACITOR SENSOR

TECHNICAL FIELD

The field of this invention is that of force measurement transducers comprised of an improved capacitance sensor.

BACKGROUND OF THE INVENTION

Transducers using capacitance sensors have been previously known but have been difficult to fabricate economically with precision and with uniform reproducibility, due to variations in the manufacturing process and inherent distortions resulting in interferences which degrade the precision and accuracy of capacitance output. Previous capacitor sensor transducers have had less than desirable response characteristics due to nonlinearity and hysteresis of the substrates, and have been undesirably sensitive to variations in temperature. No previous mention or use of a liquid crystal display cell as a capacitor has been found or is known in the literature or in the art and industry of force transducers.

DESCRIPTION OF PREVIOUS ART

Transducers using capacitance sensors have been previously known, but without the improved capabilities of the subject invention. Precision capacitance sensors have been expensive to manufacture due to the requirement for meticulous and selective fabrication, and due to lack of quantity processing means of precision fabrication.

In Charboneau et al (4,716,492) and Kawate et al (4,951,236) plates of the capacitive pressure transducer are preferably opaque metal or ceramic substrates; having a diaphragm with conductive surface; spaced apart by balls of glass or ceramic, or by cylinders or fibers of glass or ceramic, in a vaporized binder; with a metal support ring; and do not teach or disclose advantages of transparent substrates nor batch manufacturing techniques.

In Anderson (4,806,783), the capacitor transducer 50 is formed by a recessed capacity in quartz substrates 52 and 53 having fused capacitor plates 56 and 57, respectively; with no spacers; with emphasis on circuitry and charge injection cancellation; does not teach the use or advantages of optical and batch manufacturing techniques nor transparent electrodes; and by comparison is expensive to manufacture.

In Shkedi et al (4,987,782), using a ratioing oscillator circuit with twin capacitor, pressure capsule, the conductive films 26 through 34 on the quartz structure 18 comprise pressure-sensing capacitors which affect the frequency of the associated oscillator; but do not disclose or teach the advantages of transparent substrates with transparent coatings, nor the economies of scaled patterns or batch panel processing.

Southworth et al (4,972,717 and 5,044,202) shows a pressure-responsive variable capacitor with a flexible diaphragm 16 and a relatively rigid base 12 device, both of zero hysteresis loss material such as ceramic; the capacitor formed is not truly parallel; preferred material is opaque alumina, quartz or sapphire, with conductive layers 20, 22 of gold or the like, being opaque; and coating is screen printed, not scaled or batched.

In Jonsson et al (4,935,841), substrate 101 is thicker than diaphragm 103, each of which is of recessed opaque glass ceramic, with opaque conductors, with respective capacitor plates 109 and 111 thereon; claims reduction of stray capacitance errors by making the bottom plate locally in thickness relative to the top plate, while using the thick plate for rigidity.

Similarly, in Hegner et al (5,050,034) the substrates 11 and 12 are of ceramic, glass or a single-crystal material, with capacitor plates 14 and 15 thereon; joined and spacing of substrates by means of solder; with the electrode completely covering the diaphragm; does not teach spacing by means of uniform shaped fiber spacers; and substrate 12 may alternatively be a flat elastic disc like substrate 11. Hegner et al (5,050,035) is of general interest relating to thick film production techniques; and specifies no glass in conductive paste.

Improved precision, elimination of distortions, and low cost method of manufacturing, as disclosed in the improved capacitor sensor of this subject invention, are not taught in the above listed patents nor in any previously known transducers within the industry.

SUMMARY OF THE INVENTION

This invention discloses a device and method for quantity production of a parallel plate, variable gap, air dielectric, capacitance sensor using vitreous substrates and transparent electrodes. The sensor capacitance is a function of the force applied perpendicular to the plates. The sensor is a force transducer which can operate directly, as a pressure sensor or as the active element in an accelerometer or the like. The invention provides a precision capacitor sensor used as a force measurement transducer, and a low cost method for manufacturing it, for inexpensive sensing and precise measurement of applied force or displacement on applications such as pressure gages, accelerometers, barometers and the like. The device comprises a parallel-plate, variable-gap, air dielectric, capacitive transducer in which the sensor plates are comprised of vitreous materials such as glass and coated with electrical conductive coating as the electrodes. At least one of the sensor plates is transparent, being comprised of transparent vitreous materials and with transparent electrical conductor coating. The process uses liquid crystal manufacturing techniques to construct a capacitor with improved capabilities. The preferred substrate is glass, but various vitreous materials such as ceramic or quartz may be used.

Vitreous materials such as glass and quartz, as comprising this device, have the property of being perfectly elastic with zero hysteresis, making an excellent spring. The individual substrate plates are coated with a conductive pattern as the electrodes and precisely spaced apart to form the air dielectric capacitor. Precise spacing between the plates is by use of controlled diameter spherical or cylindrical fibers. These fibers are blended within an epoxy adhesive that joins the two glass plates together.

The variable capacitance of this low-hysteresis, transducer, force sensor device is used as a means for cooperating with and controlling electronic circuit means for providing analog output signals corresponding to variable forces such as the frequency of an oscillator or other known equivalent electronic output signal measurement and reading device. Alternatively, this device may be used to measure changes in temperature; and alternatively may be used to measure changes in ambient pressure.

The improved sensor of this invention is similar to an empty liquid crystal display cell (LCD), but differs from a typical LCD in that it has no fibers in the active areas, lacks alignment layer coating and liquid crystal. The improved sensor is also preferably not sealed as required by LCD cells.

A unique feature of the invention is use of transparent materials for at least one of the substrate plates in conjunction with transparent conductive coatings such as indium tin oxide (ITO) for the electrode or electrically conductive coating on said transparent substrate, thus permitting use of optical measuring techniques to rapidly and easily determine parallelism of the plates, for inspection of quality during manufacture of the sensors. This permits easy, rapid, efficient and economical grading and process control of the sensors during fabrication with resulting improved precision performance of the product within a more economical cost to manufacture.

THE DRAWINGS

In FIG. 1, for purposes of illustration, components 1-13 of the capacitor sensor are exploded vertically, showing the seal rings 6 and 7 and the vias 13, sandwiched between top plate 1 and the bottom plate 2, with top plate 1 being in sandwiched position relative to, but elevated above, the bottom plate 2, for purposes of illustration, thus exposing the relative positions and locations of conductive coating 3, 4, and 5, and the relative, exploded position of non-conductive seal rings 6 and 7, gaps 8 and 9, uncoated area 10, contact areas 11 and 12, and vias 13. The conductive coatings 3, 4, and 5 are shown as dotted areas. Coating 3 is on the bottom side of top plate 1, and coatings 4 and 5 are on the top side of bottom plate 2. Uncoated area 10, located between coating 4 and coating 5, provides a nonconductive space which serves to insulate coating 4 from coating 5.

FIG. 2 shows typical stress-strain curves 16, 17 and 18; with curve 16 as a straight line curve showing zero hysteresis for vitreous materials such as glass and fused quartz, and with curves 17 and 18 showing the permanent set or distortion resulting from deflection of crystalline materials such as metals. Each of the curves shows relative stress-strain, physical deflection of the material in relation to the amount of stress applied, as the stress is increased, and likewise shows the amount of return deflection as the stress is thereafter decreased and returned to zero. Curves 17 and 18 for crystalline materials shows the degree of permanent deformation and lack of ability to return to original shape after being stressed. The dotted curve 18 shows that as the stress is decreased, the crystalline materials do not return to true original position, but result in a relative amount of retained deflection. The curve for vitreous materials shows no retained deflection, in that, as the stress is decreased, the vitreous materials return to the true original position that existed before deflection.

In FIG. 4, each of the individual sensors 19 is the resulting composite pattern of components 1-13 of FIG. 1, or of equivalent patterns. FIG. 4 shows an array of patterns 19 on a single panel 20 for quantity, batch processing and fabrication, showing this panel 20, for example to be typically of substantially square shape, being typically of four or more sensors 19 to the side, for a multiple quantity of sixteen or more individual sensors on one panel array 20.

DESCRIPTION OF THE PREFERRED EMBODIMENTS

Figure 1:
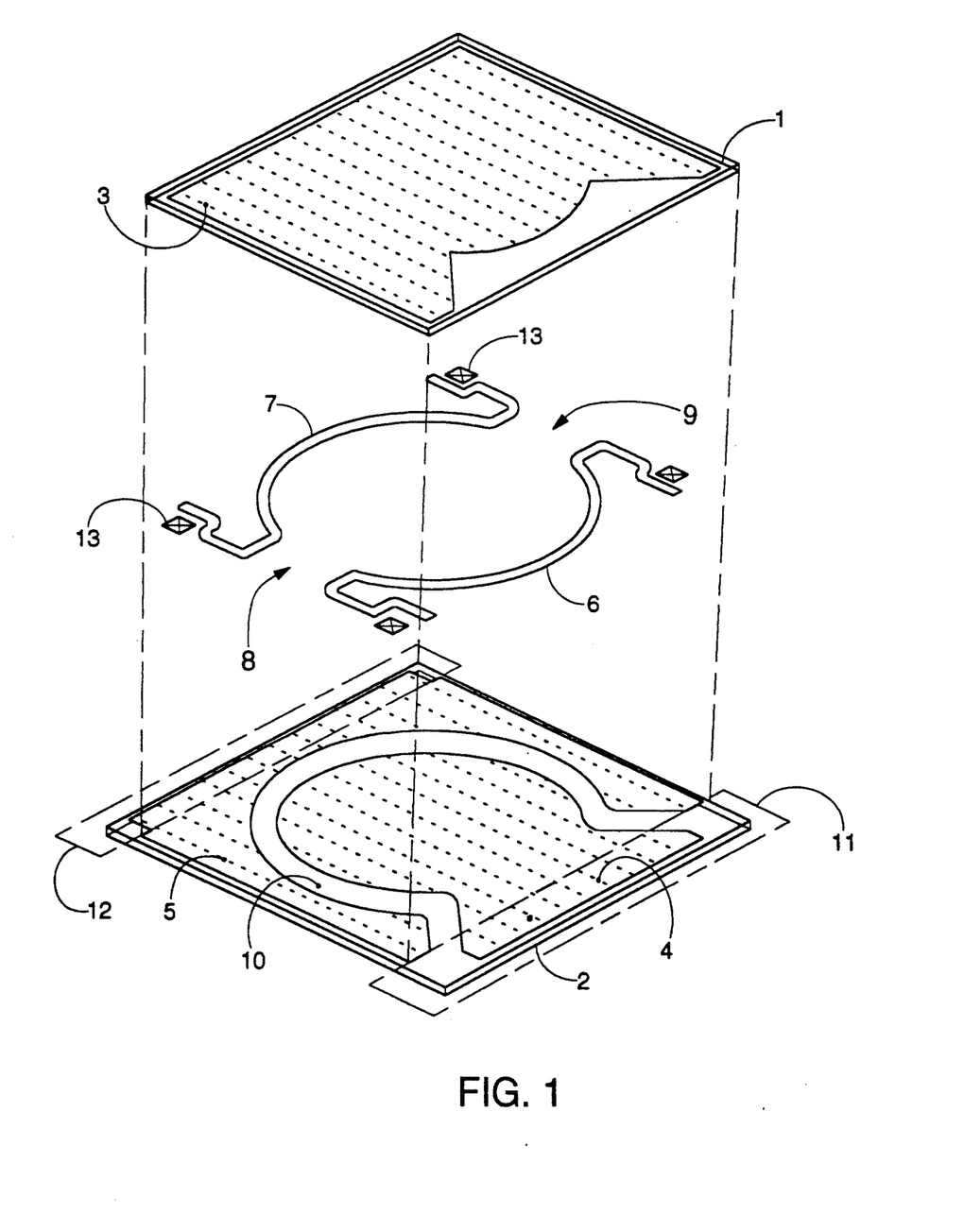
FIG. 1 is an perspective, exploded view, assembly drawing of the preferred embodiment of the capacitor sensor disclosed herein.

With reference to FIG. 1, an air dielectric, parallel-plate, capacitor sensor, constructed of two glass plates, is comprised of a top glass plate 1 and a bottom glass plate 2. The bottom plate 2 in the preferred embodiment is relatively thick as compared to the top plate 1. An electrically conductive coating 3 is deposited on bottom side of the top plate 1, and conductive coatings 4 and 5 are deposited on upper side of the bottom plate 2. The plates are separated and bonded together by two seal rings 6 and 7. The seal rings 6 and 7 are comprised of a suitable nonconductive adhesive matrix containing nonconductive spherical or cylindrical glass fibers, of low coefficient of thermal expansion, dispersed throughout to form a relatively homogeneous mixture. The adhesive is deposited, bonded and cured at high temperature under pressure which forces the glass fibers to a single thickness. The glass fibers thereby act as uniform spacers separating the top plate 1 and the bottom plate 2 by a predetermined, precise, uniform and fixed distance.

Conductive coatings are deposited on at least the inside surface of the top plate 1 and the inside surface of the bottom plate 2 in a pattern such as, but not limited to, that shown in FIG. 1. In the preferred embodiment, conductive coatings of identical material and of identical thickness and pattern are deposited on both the inside and outside surface of at least the top plate 1. Because the conductive coating is deposited at high temperature, single side coating would cause the thin substrate to tend to assume a curved shape at room temperature. This is due to thermally induced stresses resulting from cooling of the conductive coating, after deposition, because of the difference in coefficients of thermal expansion between the glass plate and the conductive coating. The conductive coating contracts more than the substrate, producing a pressure distortion in the substrate plate. Coating of both surfaces provides a balance of uniform forces, and prevents curving of the top plate, which would result if coated on only one side, by inducing equal stresses on the opposite side of the plate, effectively canceling the effect of stresses on the one side.

In addition to preventing perfectly parallel plates, this differential in thermal-expansion stresses which would result from single sided coating, can lead to undesirable capacitance variations what would result from ambient temperature changes. The degree of curvature is a function of temperature which alters plate spacing. This effect is minimized by coating both sides of the substrate with an identical conductive coating and pattern. This second coating may also be used as an electrostatic shield and equivalently as a heating element.

In FIG. 1, the bottom plate 2 is coated on its upper surface with an inner coating pattern 4 and an outer coating pattern 5 separated by an uncoated area 10. The inner pattern 4 and the outer pattern 5 are thus electrically isolated from each other by the nonconductive uncoated plate area 10. Seal rings 6 and 7 are of nonconductive materials, located between upper plate 1 and lower plate 2, being the adhesive matrix which bonds those plates together, and which, with the fibers therein, uniformly spaces the plates a precise distance apart. Seal rings 6 and 7 are shaped in a circular position to form the area of the dielectric and diaphragm flexure pattern of the top plate 1. The effective capacitive plate area is thus the circular area of the bottom plate inner pattern 4. This increases sensor sensitivity and linear response by forming effective circular conducting surfaces thus minimizing perimeter electrical fields, fringing and edge effects.

In the preferred embodiment, the top plate 1 of FIG. 1 will be coated on both sides with a transparent conductive coating 3 such as indium tin oxide (ITO). The coating thickness determines the electrical resistance of the coating. A coating thickness of 3 microinches to 32 microinches will correspond to a resistance of 100 to 1 Ohm per square ratio respectively. The bottom plate coating 4 and 5 of FIG. 1 is of a lower resistance metal such as gold, nickel or chrome. This reduces the adverse effect of coating resistance on sensor performance. Metallic coatings such as gold or nickel reduce the equivalent series resistance by a factor of 100 or more as compared to ITO. It is likewise recognized that the reverse of said coating arrangement will provide equivalent results wherein the bottom plate 2 could have the ITO coating, and the top plate would have the metallic coating; and likewise, bottom plate 2 could have conductive coating pattern 3, and top plate 1 could have conductive coating patterns 4 and 5.

The top plate 1 in FIG. 1 is somewhat smaller than the bottom plate 2. When matched and bonded together there is thus an exposed area of the bottom plate 2 along the two edges 11 and 12. Four electrical crossover "vias" 13 of an electrically conductive adhesive are deposited on the bottom plate 2 in a pattern such that contact is made with only the bottom plate outer pattern 5. In this disclosure, a "via" is defined as an electrical interconnect between the two plates. After curing under elevated temperature and pressure, the vias 13 thus complete an electrical circuit between the bottom plate 2 outer pattern coating 5 and the top plate 1 lower pattern coating 3. Electrical connections to the sensor are accomplished by connecting external electrical contacts, not shown, to the exposed area 11 of the bottom plate 2 inner pattern coating 4 and to the exposed area 12 of the bottom plate 2 outer pattern coating 5. Typically the connecting will be accomplished by soldering, and alternatively, the soldering may be equivalently accomplished by bonding, using conductive epoxy, in lieu of soldering.

In the preferred embodiment, the top plate 1 of FIG. 1 is relatively thin as compared to the bottom plate 2. A typical top plate thickness is about 10 mils. The bottom plate thickness would preferably be 3 to 4 times thicker, and thus would be typically 30 to 40 mils. The top plate 1 is therefore relatively sensitive to flexure forces as compared to the bottom plate 2. This increases sensor accuracy and linear response by reducing flexure of the bottom plate to an insignificant level. Selection of a substantially thicker bottom plate 2 also provides increased rigidity and strengthens the sensor. The improved rigidity also reduces susceptibility of the bottom plate 2 to distortion, or curving, as a result of thermal effects or ambient temperature changes. Therefore, in the preferred embodiment, coating both sides of the bottom plates may not be required. The bottom plate 2 is also normally bonded to a metal case which serves as a shield.

In the preferred embodiment, the plates 1 and 2 are separated by glass fibers of uniform, predetermined diameter, dispersed in the seal ring 6 and 7 adhesive. Typical fiber diameters are 7.5 to 18 microns (296 to 709 microinches). Since fiber diameter determines the width of the space between plates, sensor sensitivity will increase with decreasing fiber diameter. In FIG. 1, the seal rings 6 and 7 are semicircular in shape separated by two gaps 8 and 9, which serve as ports through which the air dielectric may flow out and in as the top plate 1 is deflected. As the top plate 1 is flexed, the air dielectric is displaced and forced out through gaps 8 and 9 in the seal rings 6 and 7. Two gaps 8 and 9 are shown in FIG. 1, orientated 90 degrees to the sensor edges used for electrical connection. This prevents materials from entering gaps and contaminating the sensor when electrical connections are made. Gap size and spacing determine sensor damping factor which will be a controlled characteristic for alternative applications such as seismometers. Gas damping has negligible thermal viscosity, so damping is not a function of environmental temperature.

The seal rings 6 and 7 of FIG. are applied by screen printing a symmetric pattern around the active area. Typically the trace width of the seal ring patterns 6 and 7 is about 20 mils. Use of the circular pattern shown simplifies flexing forces acting on the glass top plate 1, reducing a potential source of sensor nonlinearity. The inside dimension of the seal ring patterns 6 and 7 defines the sensor diaphragm diameter. This is the active flexure area of the sensor. Curing of the adhesive composing the seal rings 6 and 7 is accomplished at a relatively high temperature and under pressure applied to the plate surfaces of substrates 1 and 2, thereby compressing the adhesive material. Under the applied pressure, the glass fibers roll or slide as necessary to provide a uniform plate spacing of one fiber diameter.

It should be understood that the properties of the sensor as a function of temperature are governed by the glass and not the binding adhesive. When the plates are returned to room temperature after curing, the adhesive contracts, leaving the fibers accurately spacing the plates. Only the very low coefficient of thermal expansion of the fiber material now affects the plate spacing. Not until the adhesive cure temperature is again surpassed does temperature expansion of the adhesive affect sensor capacitance.

Sensor accuracy and linear response are directly related to parallelism of the top and bottom plates. Ideally, the plates would be perfectly parallel. Because both the top plate 1 and the conductive coating 3 are transparent, parallelism of the plates may be determined by optical measurement techniques. By viewing the sensor in fluorescent light, and equivalently in monochromatic light, the light interference bands may be directly observed. These bands are known in the art as Newton's Rings. Newton's Rings are faint geometric bands spaced at one half wavelength intervals due to differential interference of the light in the minute gap between the plates. Wherever there is a half-wavelength increase or decrease in spacing between the top and bottom plates 1 and 2, an interference band is seen. In effect these are contour lines revealing deviation in spacing between the two plates in half wavelength increments. The pattern of interference bands and their spacing accurately gauge variations in the plate spacing with parallelism improving as the band count decreases. Two perfectly parallel plates would have no visible bands, thus showing that they were spaced within less than one half wavelength of the monochromatic light source used.

In FIG. 1, construction of the sensor as described comprises a parallel plate, air dielectric capacitor with an effective electrical plate area defined by the circular area of the bottom plate 2 inner coating pattern 4, and an effective mechanical diaphragm defined by the inside diameter of the seal rings 6 and 7, and being that part of the top plate 1 surface inside the seal rings 6 and 7. The sensor capacitance is a function of the plate spacing. As the top plate flexes, the effective plate spacing is reduced or increased, resulting in a proportional increase or decrease in capacitance.

Figure 3:
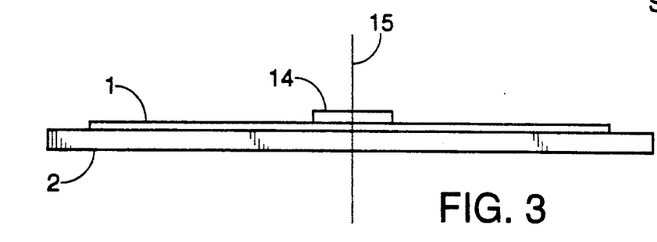
FIG. 3 is a schematic diagram of precise location of components of the capacitor sensor for desired sensitivity, minimum distortion and maximum linearity when used, for example, as an accelerometer, showing the preferred location and position of the seismic mass 14 in relation to the top plate 1 and bottom plate 2, with axis 15 passing through the center of mass of the seismic mass 14 and through the center of the flexure of top plate 1.

Application of the sensor in a force transducer requires mounting of the sensor and making appropriate mechanical connections, as shown in FIG. 3, such that the force to be measured or monitored, such as for example the inertial mass 14, is applied directly or indirectly to the center of, and perpendicular to, the top plate diaphragm 1, so that the force acts directly through axis 15, through the center of flexure. The sensor is then connected to an electrical circuit by lead wires, not shown, connected to the exposed bottom plate edges 11 and 12 of FIG. 1. The electrical circuit as connected to the capacitor sensor then provides an output signal corresponding to the input force. Transducers having capacitor force sensors cooperating with electronic circuit means for providing analog output signals corresponding to variable forces are well known within the industry, so that the electronic output signal means to be used with this improved capacitor sensor are not further described herein, and it will be understood that any conventional electronic output signal means used with the sensor are within the scope of this invention.

Some applications of the sensor such as, but not limited to, an accelerometer require that a small inertial mass 14 be bonded to the top plate 1 as shown in FIG. 3, creating an inertial system which tends to remain stationary as bottom plate 2 of the sensor follows the motion of the surface to which it is attached. The axis 15 of the mass 14 must act through the center of flexure and perpendicular to top plate 1. Relative motion between the two plates 1 and 2 then alters the sensor capacitance by changing the plate spacing.

Exact mounting of the inertial mass with axis 15 passing through center of mass 14 and through the center of flexure of the top plate 1 as shown in FIG. 3 reduces undesirable motions due to asymmetric torsional forces. For maximum linearity, an axis 15 drawn normal to the plane of the plates should pass through both the flexure center and the center of mass of the inertial mass 14, as shown in FIG. 3. Because of the transparent substrate used in conjunction with transparent conductor coatings as disclosed herein, optical measurement techniques can be used to precisely position the mass. By observing Newton's Rings as the mass is positioned, it is relatively easy to precisely center and mount the mass. If the mass is off center, the concentric interference bands are distorted. Positioning the mass for minimum band distortion locates it to within one half wavelength of the color light used. For the 5461A green light industry standard for monochromatic light source, this is within 10.75 microinches. Shorter wavelength such as blue light, for example, would provide greater accuracy, which is within the purview of this disclosure. An obvious requirement of this technique is that the weight of the mass must be sufficient to flex the glass at least one half wavelength of the light source used.

The plates 1 and 2 of the capacitor comprise conductive coatings 3, 4 and 5 on at least the inner or facing surfaces of the parallel, elastic substrates of glass, ceramic or quartz which are spaced apart by means of spherical or cylindrical fibers bonded by an adhesive. The variable capacitance of this low-hysteresis device is used as a means for controlling the frequency of an oscillator. As an option, all four faces of the two substrates may bear conductive coatings, more for structural stability and elimination of distortion than for electrical considerations.

Sensor function occurs when an input force changes the sensor capacitance by varying the plate spacing. Although glass is the preferred substrate material it is recognized that the technique permits substitution of specialty materials such as quartz, ceramic or plastic as application dictates. The facing sides of each plate have a patterned conductive coating to provide the overlapping area which form the capacitor and necessary interconnections. While the active area of the capacitor may take any required shape, a circular area minimizes edge effects and maximizes linearity.

Because sensor sensitivity is a function of the difference between the nominal zero load capacitance, and the capacitance due to the applied force, all parasitic or interconnect area overlap capacitance must be reduced to a practical minimum. For example, if the conductive area of both plates 1 and 2 in FIG. 1 covered the entire surface rather than the pattern shown, sensitivity would be reduced by a factor of two. Sensitivity is also a function of plate dimension, being directly related to plate area and inversely to plate thickness. The larger the area and thinner the plates the more sensitive the sensor.

The top and bottom plates 1 and 2 are separated by uniform diameter glass fibers. As used herein the term fiber refers to spacers without regard to their intrinsic shape. Typically they are either spherical or cylindrical. These are dispersed in a matrix of suitable non-conductive adhesive such as epoxy which both forms the seal rings 6 and 7 and bonds the plates 1 and 2 together.

A novel feature of the invention is use of transparent conductive coatings such as indium tin oxide (ITO) in conjunction with transparent substrate plates. Because both the substrate and the ITO conductive coating are transparent, parallelism of the plates may be easily determined by optical measurement techniques. By viewing the plates in fluorescent or monochromatic light, Newton's Rings may be observed. Visual inspection of their shape and number can rapidly determine the quality of the sensor. This permits easy grading and process control. Alternatively, this device may be used as a temperature transducer to measure changes in temperature. By choosing two different electrical coating materials for the upper and lower faces of the top plate, with differences in coefficient of thermal expansion, a thermal arrangement will result in which changes in temperature will cause stress curves in the top plate, resulting in directly measurable variations in capacitance; and likewise, equivalent results are achievable by leaving the upper face uncoated for an equivalent thermal effect between the uncoated glass substrate and the coating material of the lower coating. Alternatively, this device may be used as a pressure and vacuum change measurement transducer. By closing and sealing the air gaps 8 and 9 of FIG. 1, the air dielectric within the capacitor will be trapped and will expand and contract in response to variations in external pressure, causing curvature deflection in the substrates that will result in directly measurable variations in capacitance. For alternative force measurement applications, the dielectric may equivalently be of other non-conductive control media well known within the industry such as vacuum, air, or other gases.

DESCRIPTION OF METHOD OF MANUFACTURING CAPACITOR SENSOR

Figure 4:
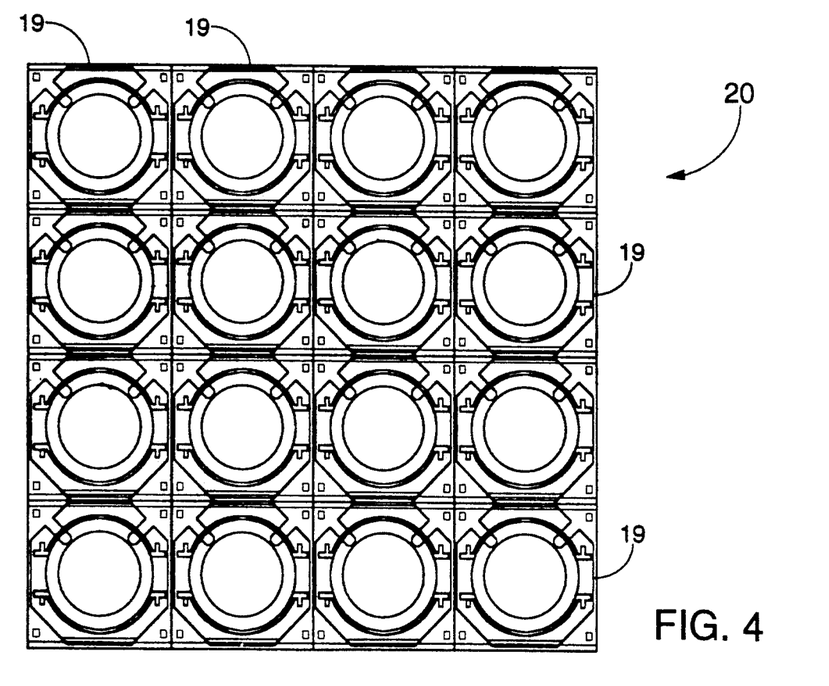
FIG. 4 shows a typical batch panel 20 of an array of capacitive patterns for several individual sensors 19, arranged for economy of manufacture as described herein.

The following is a description of the method for economical and efficient manufacture of the precision capacitor sensor:

1. It will be understood in this disclosure that, within the selection of materials for plates and selection of electric conductive coating materials, it is well known practice within the industry to commercially procure pre-coated plate materials on which selected coating has been previously applied by the manufacturers; and alternatively, if uncoated plate materials are selected, then the selected coating will be applied using conventional coating processes. After preparation and cleaning of said coated plates, using standard methods well known and common in the industry, the conductively coated substrates will then have the required pattern defined on the conductor. First a photoresist is evenly spread on the entire surface of the substrate. This coating is cured according to the specific requirements of the particular photoresist chosen. The pattern 19, as shown in FIG. 4, is produced on the conductor by exposing the photoresist to ultraviolet (UV) light with the required pattern interposed between the UV source and the photoresist covered substrate. The required pattern 19, is preferably repeated in an array of columns and rows, as shown in FIG. 4, forming multiple photo images on either film or glass thus producing multiple sensors simultaneously. After exposure, the photoresist is developed in a manner like standard exposed camera film leaving the required pattern in photoresist resistant to a subsequent wash which removes the photoresist not forming part of the pattern. After wash and rinse, the unwanted conductive coating is removed by exposure to a suitable etchant leaving only the desired conductive coating etched in the required pattern. Finally the remaining photoresist that protected the desired pattern during etching is removed with a solvent suitable for the particular photoresist selected. The sequence described assumes positive photoresist but it will be understood that negative photoresist can be used and will provide equivalent results and is included in this disclosure.

In this manufacturing method, patterning of the conductive coatings is scaleable, to achieve economical production of different sized sensors. For either a single sensor, or preferably for the pattern of an array of sensors in batch panels, as in FIG. 4, the photographic process may be used to enlarge, and equivalently to reduce, the size of patterns for fabrication of any number of different sizes of capacitor sensors. Alternatively, the scaled enlargement and reduction may be accomplished by means of computer aided design. It will be recognized that, in such enlargement, the pattern will be directly scaleable in all regards and dimensions, except for good practice, certain control areas such as outside electrical contacts, and others, will preferably be retained at a standard nominal size.

2. After the patterns 19 for the conductive coatings of the capacitor sensor have been produced on the glass plates 20, the seal-rings 6 and 7 and the cross-over vias 13 are fabricated. The seal-rings 6 and 7 provide a method of precisely spacing and bonding the plates 1 and 2 of the capacitor sensor using a plurality of glass fibers or spheres in a suitable adhesive such as epoxy deposited on the inner surface of one glass plate by an of a number of common techniques such as screen printing, or computer controlled dispensing pen. In the preferred method, a screen is prepared using photolithographic means in like manner as described above for defining the conductive pattern. The plurality of glass fibers or spheres contained within the adhesive mixture is spread on the top surface of the screen. The screen is arranged to be parallel to and covering the glass substrate with the patterned conductive coating but supported over and not in contact. It will be understood that the seal ring pattern must be placed in a predetermined place on the glass substrate in relation to the pattern of the conductive coating and means must be provided for aligning the screen and conductive pattern but are somewhat arbitrary and well understood and common in the industry and not further described here. A means is then provided to force the screen locally into contact with the glass substrate while also forcing the adhesive glass fiber mixture through the open mesh of the screen through the photolithographic pattern defining the required seal ring pattern.

3. In like manner to screen printing the seal rings 6 and 7, the cross-over vias 13 required to make electrical contact between the inner surface coating patterns 3 and 5, in FIG. 1, of the top plate 1 and bottom plate 2 of the capacitor sensor are produced on the second glass substrate using a conductive adhesive such as but not limited to conductive epoxy. Alternatively the seal rings 6 and 7 and the cross-over vias 13 may both be deposited in specified manner on a single glass substrate using a computer controlled dispensing pen or pens, and be within the scope of this invention.

4. When both seal ring and conductive cross-over vias have been fabricated on the glass panels, the two are assembled in proper alignment using means somewhat arbitrary and well understood and common in the industry with the inner surfaces of the capacitor sensor, facing each other and mated by applying heat and pressure. The heat is at such temperature as is required to cure the specific adhesive selected but will be substantially elevated above ambient for example 150 degrees or higher. The pressure forces the spacing of the inner surface of the diaphragm to the first capacitor plate of the sensor to be accurately determined by the diameter of the glass fibers or spheres dispersed within the seal ring adhesive mixture.

5. Once the seal ring and conductive cross-over via adhesive is cured the glass panels containing the multiple column and row array of capacitor sensors, as shown in FIG. 4, may be visually inspected for proper assembly by optical means. Due to the transparent nature of the preferred glass and conductive coating, use of fluorescent light, and equivalently other light source of known wavelength such as monochromatic light, reveals concentric bands formed by the interference at one half wavelength intervals of the light source. Wherever there is a half-wavelength increase or decrease in spacing between the diaphragm and the first capacitor plate an interference band is seen. For example, use of green light at 5461 Angstroms provides concentric bands at intervals of 10.75 microinches. Thus how parallel the two plates of the capacitor are, can be readily determined by count of the bands.

6. After grading, the individual capacitor sensors are separated from the column and row array by standard scribe and break methods well understood and common in the industry. Each individual capacitor sensor may then be measured on standard commercially available equipment to determine its nominal capacitance and its transfer function of capacitance versus force. If the capacitor sensor is to be used as an accelerometer or other kinetic force transducer such as an geophone, seismometer, gravimeter or inclinometer, an inertial mass must be attached. This is facilitated by the use of transparent substrate and conductive electrodes. Addition of the inertial mass alters the concentric interference bands, so observations of their form and pattern permits accurate placement of the center of gravity of the inertial mass with the concentric center of the capacitor sensor. Attachment may then be by way of ultraviolet cured adhesive, fixing the inertial mass permanently in place without the usual and expected limited time constrains of common adhesives.

7. This completes the fabrication of the invention except for attachment of electrical connection to the conductive coatings forming the plates of the capacitor sensor. This is accomplished by one of several common means such as soldering, conductive epoxy or conductive elastomers.

8. In the preferred method the conductive coatings are defined by photolithographic and etch techniques using standard methods well known in the industry. It will be understood that either liquid or dry film, positive or negative photoresist, may be used and will be equivalently within the scope of this disclosure. Alternatively the required pattern may be defined by screen printing and etching. Alternatively a computer controlled pen can draw the pattern directly on the glass using appropriate resist; and each of these methods is intended to be equivalently within the scope of this disclosure.

STEPS IN THE MANUFACTURING PROCESS

The steps in manufacturing processes for economical and efficient production of this precision capacitor sensor comprise the following:

a. Select substrate material:
   borosilicate glass        Corning
   zirconia                  Marketech International
   1 mil silicon             Virginia Semiconductor, Inc
b. Select and apply coating for substrates:
   ITO, Au, Cr, Ni, etc.     OCLI, Balzers
   Metallo-organics          Engelhard, ESL
c. Clean said coated plates in preparation for patterning:
   degrease with acetone
   place in boat
   place in Commodore Blue soap heated to 80 C.
   agitate with ultrasonic
   move to rinse tanks for 15 minute intervals
   each tank. Three tanks;.
   place in SRD (spin-rinse-dry) in weight matched pairs
d. Pattern said conductive coating to form sensor pattern:
   via photolithography
   coat with photoresist
      liquid
      dry film              DuPont Riston Film
   cure (bake at 90 C.)
   visual inspection for pinholes
   expose pattern using UV light
   develop
   etch in HCl
   remove resist in acetone
   inspect
   via screen printing
   print photoresist
   visual inspection and repair
   etch in HCl
   remove resist in acetone
   inspect
   via Micropen
   print photoresist using computer controlled pen
   cure photoresist
   visual inspection and repair
   remove resist
   inspect
e. Mate glass panels, seal rings and vias:
   via screen printer
   screen print seal-ring using glass fibers on one panel
   visual inspection
   mate panels using fixture
   visual inspection
   cure in oven at 150 C. using 1.5 PSI
   cool down and remove from oven
   visually inspect alignment
   via Micropen
   deposit seal-ring material containing fibers and conductive crossovers with fibers using computer controlled pen
   visual inspection
   mate panels using fixture
   visual inspection
   cure in oven at 150 C. using 1.5 PSI
   cool down and remove from oven
   visually inspect alignment
f. Optically inspect quality of parallelism and spacing between plates:
   verify plates are parallel using monochromatic light source
g. Scribe and break panels into individual sensors:
   separate individual sensors
h. Electrical test of individual sensors:
   measure capacitance versus load transfer function
i. Position and mount inertial mass:
   inspect for precise positioning of mass, using monochromatic light source
   attach mass to glass using UV cured adhesive
j. Test individual sensors under vacuum for final acceptance.
   End of Process.

DISCUSSION OF IMPROVED CHARACTERISTICS

With demonstrated ultralow noise and drift, essentially infinite resolution and zero hysteresis, capacitance sensors can provide up to 100 times the performance available from other methods such as LVDTs, strain gauges and surprisingly, laser interferometers. In comparison to strain gauges, capacitor sensors provide greater parametric change and contain no highly stressed parts. Electrically the capacitance sensor can be easily isolated from stray electric fields, requires no magnets and can be constructed to be insensitive to magnetic fields. Coupling this potential with the improved manufactureablity disclosed herein, yields economically producible, precision pressure sensors for numerous force measurement and displacement measuring applications. A typical application using the sensor as a digital accelerometer has been described herein.

Figure 2:
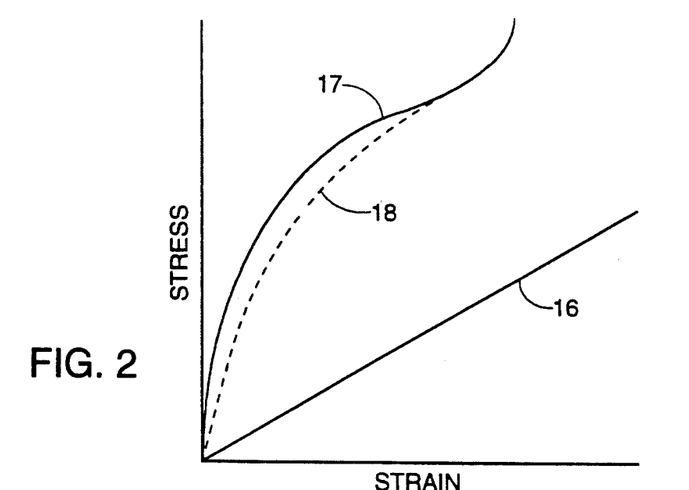
FIG. 2 is a diagram illustrating that the hysteresis for vitreous materials is zero, i.e. that vitreous materials return to their original shape after deflection.

As shown in FIG. 1, a parallel plate, air dielectric, capacitor sensor as described herein is constructed of two vitreous glass plates. These provide not only transparent visibility for inspection during manufacturing processes, but also provide near perfect elasticity and rigidity, combined with smooth flat surfaces and low coefficient of expansion to temperature variations. As shown in FIG. 2, the stress-strain curve for vitreous material is perfectly elastic, exhibiting linear deformation and negligible hysteresis with applied pressure. Sensor function occurs when a signal source changes the sensor capacitance by varying the plate spacing. For low level input signals, capacitance change with plate spacing is preferred as it provides more output than an equivalent change with plate area. It should be emphasized that the active area of the capacitor may take any required shape, although a circular area is preferred because it minimizes electrical field edge effects and maximizes linearity. Sensitivity is of course also a function of glass dimension, being directly related to glass area and inversely to glass thickness. The larger the area and thinner the glass plates the more sensitive the sensor.

Sensitivity = area/thickness

The seal rings 6 and 7, in FIG. 1, are applied by screen printing a symmetric pattern around the active area. Typically the trace width of the seal ring pattern is about 20 mils. Use of the circular pattern shown simplifies flexing forces acting on the glass plate, reducing a potential source of sensor nonlinearity. The inside dimension of the seal ring pattern defines the area used in calculating sensitivity.

Because the conductive coating is deposited at high temperature, single side coating causes the thin glass to assume a concave shape at room temperature. This is due to the difference between the thermal coefficient of expansion of the glass and the conductor material. Having a greater coefficient of expansion, the conductive coating contracts more than the glass, creating a tension that bows the glass inward toward the coating. In additional to preventing perfectly parallel plates, this effect can lead to undesirable capacitance variation due to temperature. This is because the bow is a function of temperature and alters plate spacing. This problem can be minimized or eliminated by using double side coated glass. To cancel stresses, the second side of the plate receives an identical conductive coating and pattern which tries to bow the glass in the opposite direction. This second coating not only cancels the stresses but eliminates its potential nonlinearities.

Again it should be emphasized that it may not be necessary to coat both plates on each side. In practice to provide flexibility the top plate which serves as the sensor is made very thin, perhaps 10 mils. This makes it particularly prone to bow and requires the glass to be coated on both sides to cancel these stresses. The bottom or reference plate however, needs to be relatively rigid compared to the top, perhaps 28 or 42 mils. This is to minimize response to the input signal. Selection of a substantially thicker bottom rigidity reduces the concave effect, so double side coating may not be required. The bottom is also normally bonded to a base mounting surface which adds rigidity.

Because the precision capabilities of this improved capacitor sensor are largely dependant on the substrate vitreous materials and the coatings, it is fortunate that industry provides many options from which to select.

Commercial soda lime and borosilicate glass panels are available in a variety of standard sizes including 20, 28 and 42 mils thickness. Quartz and Zerodur TM substrates are available for environmental extreme or low tempco sensor applications. Ceraflex, an ultra flexible zirconia is available down to 3 mil thickness. Conductive coatings of indium tin oxide (ITO), or one of several metals such as gold, nickel, or chrome are available in a range of resistivity values.

In the preferred embodiment, one plate uses transparent ITO and the other a lower resistivity metal. This permits use of optical measuring techniques as discussed herein. It also keeps coating resistivity from adversely affecting transducer performance by raising the equivalent series resistance (ESR) of the capacitor. Metallic coatings such as gold or nickel reduce ESR by 100 or more compared to ITO. If the metallic coating is applied to both sides of the top plate, minimum total ESR is achieved. Conversely, if the metallic coatings are used on the bottom plate, connections to the sensor may be soldered rather than using conductive epoxy.

As disclosed herein, an array of sensors of this invention will preferably be batch fabricated in panels measuring several inches or more on a side. A preferred typical pattern for sensors manufactured in such an array is shown in FIG. 4, which for purposes of illustration is shown here to be in a square shape, four sensors to a side, for a total of sixteen sensors in one panel. In the preferred embodiment, for economies of fabrication, a larger panel would be used, of 14 inches or more on a side. In this manner, for example, a panel which is 14 inches square will provide 169 one inch square sensors, allowing for a one-half inch handling border around each panel. Processing of the panels begins by coating them with a photosensitive resist. The entire panel is then exposed to ultraviolet (UV) light through a photomask containing a repeating X-Y array of the desired image. The exposed panels are then developed and etched. After cleaning, one panel receives the screen printed seal ring while the other panel receives the crossover vias. After mating the top and bottom panels together, they are heat cured under sufficient pressure to insure that the plates are in uniform contact with the glass fibers and therefore parallel.

Because both the substrate and the ITO conductive coating are transparent, parallel uniformity of the assembled panels may be easily determined by optical measurement techniques. This constitutes a major advantage of this disclosure. Visual inspection can rapidly and economically determine the quality of the sensors. Only known good sensors need be processed further, and process drift will be caught and corrected early in the production cycle.

After optical grading, the panels are scribed and broken into individual sensors. These may then be tested prior to integration with the electronics. Each individual sensor can be characterized for nominal capacitance value, capacitance versus force, and tempco. In contrast, previous art and competing technology using etched quartz blanks paired with a magnet to form the capacitor, must be fully assembled prior to test and evaluation. Then mechanical dimensions of the space can only be inferred from other measurements not directly observed.

To use the sensor as a pressure transducer at this point mainly requires proper mounting and mechanical connections to introduce the source of pressure to the sensing surface. Many equivalent force measurement applications are within the scope of this disclosure; but use as a digital accelerometer is described herein as a typical commercial use and for ease of comparison to equivalent utilizations. First, the bottom or reference plate must be securely attached to the surface being measured. Then a small seismic mass is bonded to the top, or sensing plate, creating an inertial system which tends to remain stationary as the reference plate follows the motion of the surface to which it is attached. Relative motion between the two plates then alters the sensor capacitance by changing the width of the space between the plates. Proper mounting of the seismic mass as described herein reduces undesirable motions due to asymmetric torsional forces.

In this invention, it is disclosed that by this method, patterning of the coatings is scaleable. For either a pattern of a single sensor, or preferably for the pattern of an array of sensors in batch panels as in FIG. 4, the photographic process, and equivalently the computer aided design process, may be used to enlarge, and equivalently to reduce, the size of patterns, as an economical means to fabricate any number of different sizes of capacitor sensors. It will be recognized that, in such enlargements and reductions, the pattern will be directly scaleable in all regards and dimensions, except for good practice, certain control areas such as outside electrical contacts, and others, will preferably be retained at standard nominal sizes.

GENERAL COMMENTS

It should be understood in this disclosure that the use of the words "plate" and "substrate" are defined to have the same and equivalent meaning; the words "conductive coating" and "electrode" are defined to have the same and equivalent meaning; the words "fiber" and "spacer" are used interchangeably without regard to their shape which may be spherical, cylindrical, tubular, rod shaped, and of other uniform shapes; and the word "via" is defined as an electrical interconnect between two plates and will have the same meaning as the words "electrical crossover". Likewise, the word "tempco" as used herein will be understood to mean the same as thermal coefficient of expansion. The terms "inertial mass" and "seismic mass" will have the same meaning. In the manufacturing method, the verb "pattern", and likewise the gerund "patterning", will be understood to be the act of making, laying out, defining and imprinting a precise pattern on a conductive coating that has been previously applied to or coated onto the surface of plate materials such as glass or other vitreous substances. In disclosing the improved sensitivity of this capacitor sensor, the word "sensitivity" is understood to mean the degree of output per given input of force and resultant ability to respond readily and effectively measure small differences in input force.

It is important to this disclosure to emphasize that at least one of the plates of the capacitor sensor will be of transparent material and its electrodes will be of transparent conductive. The transparent plate materials and transparent conductive coatings must be on the same plate. It is this combination of transparent plate and conductors which provides the visibility necessary for the novel optical measuring characteristics described herein. Likewise, it is disclosed that the transparent substrate with transparent electrode may equivalently be on the bottom plate of the capacitor sensor and thereby equivalently provide the optical measurement techniques, as in for example an application where a mirror might be placed below the transparent bottom plate for visual observation of the Newton's rings during fabrication and assembly.

It should be understood that though preferred embodiments of the invention have been described by way of illustrating typical uses of the invention, this invention includes all modifications and equivalents of the disclosed embodiments falling within the scope of this specification and appended claims.

I claim:
1. A capacitor sensor, comprising;
two substantially parallel capacitive plates comprising a first plate and second plate;
a dielectric between said plates, comprised of nonconductive materials such as air and other gases;
electrical conductive coating, forming an electrode, on at least the inwardly facing surface of each of said plates;
means for spacing said plates a precise distance apart;
said first plate comprising a mechanically flexible diaphragm being relatively capable of responding to flexure forces as compared to said second plate, wherein an input force will cause said first plate to flex, causing the effective plate spacing to be reduced or increased, resulting in a proportional increase or decrease in sensor capacitance, and sensor function occurs when said input force changes said sensor capacitance by varying said plate spacing;
each of said plates being comprised of vitreous materials for a substrate;
at least one of said plates being comprised of transparent vitreous materials; and
said conductive coating on said transparent plate being transparent.

2. A capacitor sensor according to claim 1 further comprising optical means for visual inspection of physical characteristics of said sensor such as parallelism between said plates.

3. A capacitor sensor according to claim 2 wherein said optical means is comprised of said transparency of at least one of said plates and its said transparent electrode, and means for visual observation of light interference patterns known in the art as Newton's rings, using light of known wavelength such as monochromatic light.

4. A capacitor sensor according to claim 2 further comprising an inertial mass attached to said first plate, optical means for precisely locating and mounting said inertial mass on said first plate, and ultraviolet cure bonding means for bonding said mass to said first plate, for use of said sensor as a kinetic force measurement transducer.

5. A capacitor sensor according to claim 1 wherein at least one of said plates is coated on both sides with identical said electrical conductive coating materials, thickness and pattern.

6. A capacitor sensor according to claim 1 wherein said first plate is relatively thin as compared to said second plate.

7. A capacitor sensor according to claim 1 wherein said spacing means is comprised of fiber spacers of uniform diameter, of materials of low coefficient of thermal expansion, such as glass and other vitreous materials.

8. A capacitor sensor according to claim 1 wherein said plate not having said transparent conductive coating is coated with metallic coating of substantially lower electrical resistance than said transparent conductive coating.

9. A capacitor sensor according to claim 1, wherein said dielectric between said plates is comprised of a pressure sealed vacuum.

10. A capacitor sensor according to claim 1 wherein said spacing means further comprises means for sealing said dielectric on all surfaces except through an air port of predetermined size to achieve controlled air damping of said dielectric.

11. A capacitor sensor, comprising;
two substantially parallel capacitive plates comprising a first plate and a second plate;
a dielectric between said plates, comprised of non-conductive materials such as air and other gases;
electrical conductive coating, forming an electrode, on at least the inwardly facing surface of each of said plates;
means for binding said plates together;
said first plate comprising a mechanically flexible diaphragm being relatively capable of responding to flexure forces as compared to said second plate, wherein an input force will cause said first plate to flex, causing the effective plate spacing to be reduced or increased, resulting in a proportional increase or decrease in sensor capacitance, and sensor function occurs when said input force changes said sensor capacitance by varying said plate spacing;
each of said plates being comprised of vitreous materials for a substrate;
at least one of said plates being comprised of transparent vitreous materials; and
said conductive coating on said transparent plate being transparent.

12. A capacitor sensor according to claim 11 further comprising optical means for visual inspection of physical characteristics of said sensor such as parallelism between said plates.

13. A capacitor sensor according to claim 12 wherein said optical means is comprised of said transparency of at least one of said plates and its said transparent electrode, and means for visual observation of light interference patterns known in the art as Newton's rings, using light of known wavelength such as monochromatic light.

14. A capacitor sensor according to claim 12 further comprising an inertial mass attached to said first plate, optical means for precisely locating and mounting said inertial mass on said first plate, and ultraviolet cure bonding means for bonding said mass to said first plate, for use of said sensor as a kinetic force measurement transducer.

15. A capacitor sensor according to claim 11 wherein said plate not having said transparent conductive coating is coated with coating of substantially lower electrical resistance than said transparent conductive coating.

16. A capacitor sensor, comprising;
two substantially parallel capacitive plates comprising a first plate and a second plate;
a dielectric between said plates, comprised of non-conductive materials such as air and other gases;
electrical conductive coating, forming an electrode, on at least the inwardly facing surface of each of said plates;
means for bonding said plates together a precisely spaced distance apart;
said first plate comprising a mechanically flexible diaphragm being relatively capable of responding to flexure forces as compared to said second plate, wherein an input force will cause said first plate to flex, causing the effective plate spacing to be reduced or increased, resulting in a proportional increase or decrease in sensor capacitance, and sensor function occurs when said input force changes said sensor capacitance by varying said plate spacing;
each of said plates being comprised of vitreous materials for a substrate.

17. A capacitor sensor according to claim 16 wherein at least one of said plates is coated on both sides with identical said electrical conductive coating materials, thickness and pattern.

18. A capacitor sensor according to claim 16 wherein said first plate is relatively thin as compared to said second plate.

19. A capacitor sensor according to claim 16 wherein said means for bonding said plates together a precisely spaced and parallel distance apart is comprised of fiber spacers of uniform thickness, of materials of low coefficient of thermal expansion, such as glass and other vitreous materials.

20. A capacitor sensor according to claim 16, wherein said dielectric between said plates is comprised of a pressure sealed vacuum.

21. A capacitor sensor according to claim 16 wherein said bonding means further comprises means for sealing said dielectric on all surfaces except through an air port of predetermined size to achieve controlled air damping of said dielectric.

* * * * *